Oct. 24, 1972  A. H. CORNISH ET AL  3,700,565
MICROWAVE SEWAGE SYSTEM WITH DISTILLATION MEANS
Filed April 3, 1970  2 Sheets-Sheet 1
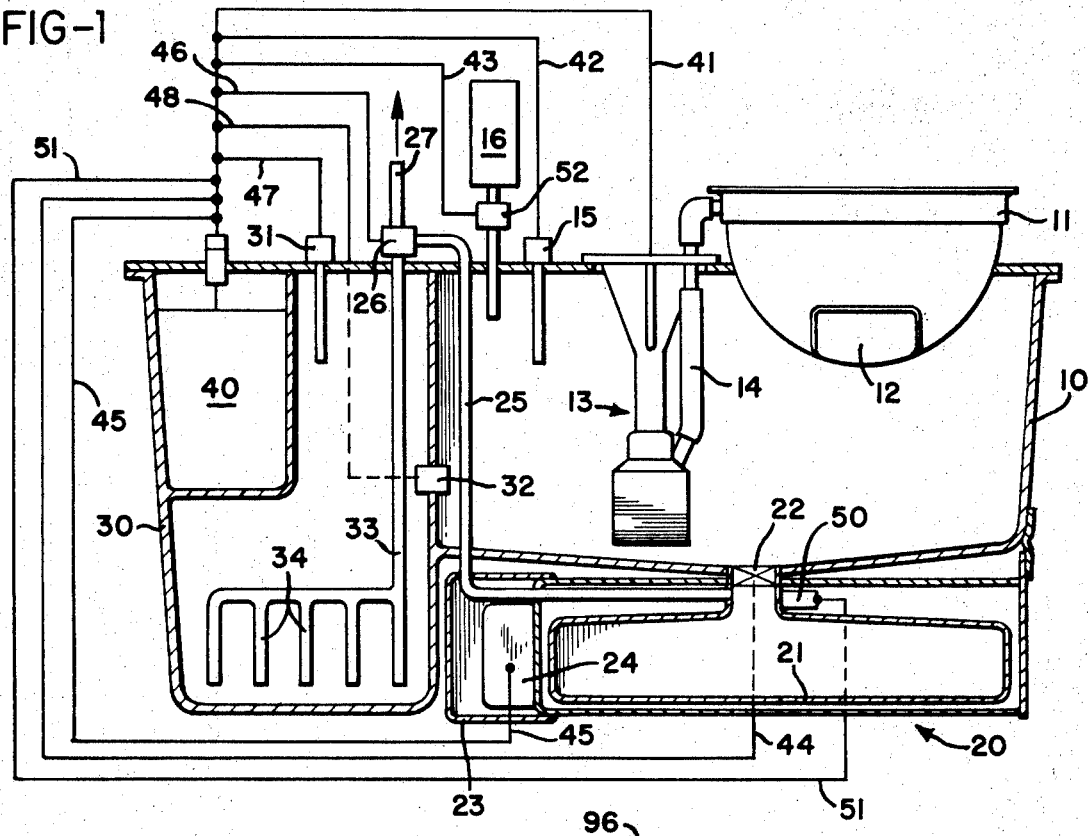
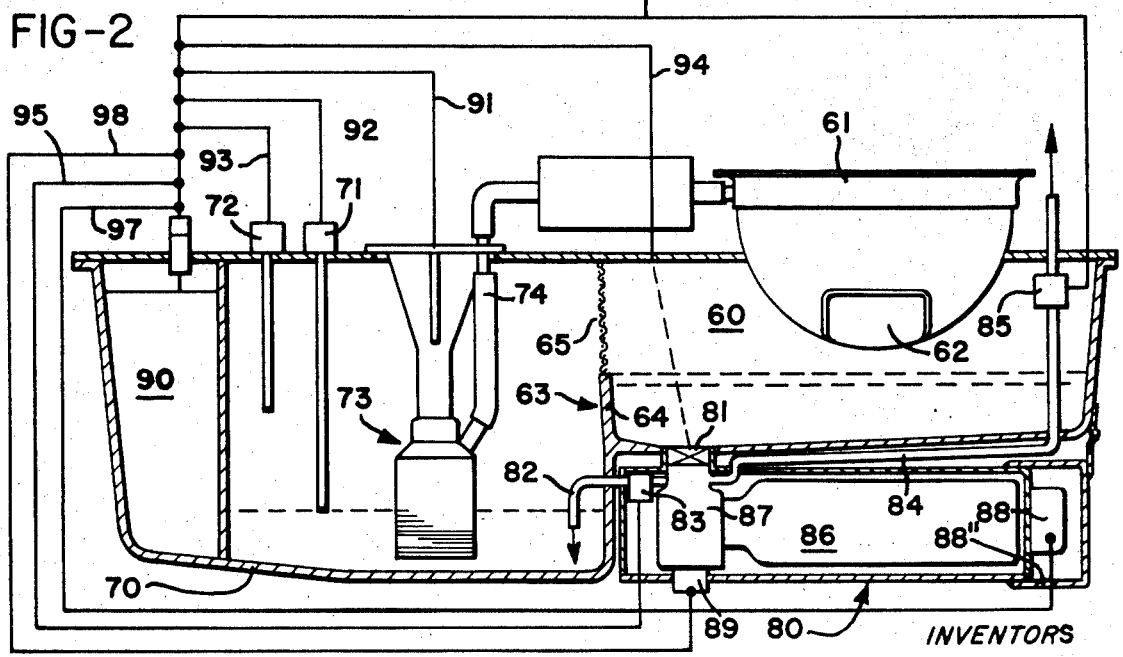
INVENTORS
ALAN H. CORNISH
ROBERT C. HELKE,
ALEX N. LeDONNE &
HUGH E. MASTER
BY Mareschal, Biebel, French & Bugg
ATTORNEYS

United States Patent Office 3,700,565
Patented Oct. 24, 1972

3,700,565
MICROWAVE SEWAGE SYSTEM WITH DISTILLATION MEANS
Alan H. Cornish, Robert C. Helke, and Alex N. LeDonne, Dayton, Ohio, and Hugh E. Masters, Old Bridge, N.J., assignors to Koehler-Dayton, Dayton, Ohio
Filed Apr. 3, 1970, Ser. No. 25,475
Int. Cl. B01d 3/00; C02c 1/04; E03d 7/00
U.S. Cl. 203—1
23 Claims

ABSTRACT OF THE DISCLOSURE

A self-contained sewage system in which a microwave energy source is provided to vaporize the liquid phase of the sewage so that it may be removed from the system and the interval between servicings of the system lengthened. The sewage is transferred from the sewage receiving tank to an evaporating tank for evaporation and, in certain embodiments used in situations where power is not at a premium, a portion of the liquid vaporized from the sewage may be returned to the system for flushing purposes.

BACKGROUND OF THE INVENTION

Pat. No. 3,067,433 describes a compact sewage system which has found widespread use in mobile environments such as in aircraft, boats, etc. In this system a bowl is mounted on a sewage receiving tank and in communication therewith so that sewage deposited in the bowl is discharged into the tank. The sewage receiving tank is primed with water and chemical additives for odor and color control and the bowl is flushed by recirculating a portion of the liquid in the sewage tank. It will be noted, however, that because the system accumulates rather than disposes of sewage, it must be serviced at fairly frequent intervals.

SUMMARY OF THE INVENTION

The servicing frequency of sewage systems of the type described above is generally improved by providing a source of microwave energy which is directed into the sewage to heat and evaporate the liquid portion thereof. The sewage is treated in this manner by first conveying it from a sewage receiving tank to an evaporating tank separate from but in selective fluid communication with the sewage receiving tank. An additional feature of the invention according to certain embodiments particularly useful in environments where power is not a a premium is the provision of means for condensing a portion of the vapor resulting from the microwave treatment of the sewage and the retention of the condensed liquid in the system for flushing purposes. Since microwave treatment of the sewage is highly selective, the frequency of the microwave source may be selected such that the sewage is the primary recipient of the microwave energy and surrounding materials, such as the tank walls or a plastic liner for the tank, are not appreciably heated. Where a liner of some type is used, it will be seen that the system may be easily serviced by merely removing the liner with the mainly solid wastes therein and replacing it with a fresh liner.

BRIEF DESCRIPTION OF THE DRAWINGS

FIG. 1 is an elevational view, partially in cross section, showing one embodiment of the present invention;
FIG. 2 is a view similar to FIG. 1 showing a second preferred embodiment of the invention.

DESCRIPTION OF THE PREFERRED EMBODIMENTS

Figure 3:
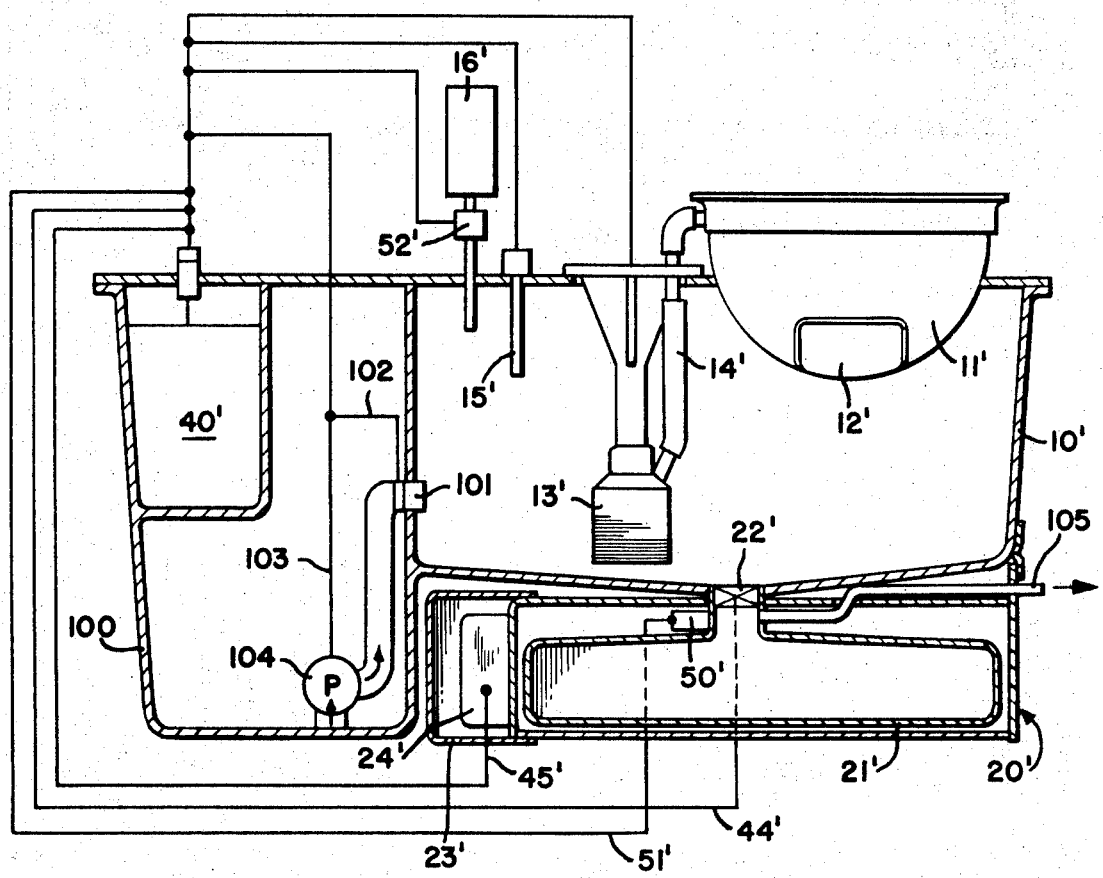
FIG. 3 is also an elevational view, partially in cross section, showing a further preferred embodiment of the invention.

As seen in FIG. 1, the sewage system of the present invention may comprise a sewage receiving tank 10 having a bowl 11 mounted thereon and in fluid communication therewith through the discharge outlet 12. A recirculating pump 13 is mounted in the tank and communicates with the bowl 11 through a conduit 14. The bowl and recirculating pump 13 may be and preferably are of the same type disclosed in Pat. No. 3,067,433 and reference may be had to that patent for specific details of these components.

Mounted on the sewage tank 10 is a level sensing device 15 and reservoir 16 containing a supply of chemical additives for color and odor control. Mounted immediately beneath the tank 10 is a second tank 20 forming a resonant chamber and totally enclosing liner 21 with a valve 22 providing selective communication between the tanks 10 and 20. On the outer wall of the tank 20 a microwave unit 24, which may be of conventional construction, is positioned to subject the contents of the tank 20 to microwave energy and unit 24 is provided with an enclosure 23 to protect against radiating microwave energy.

A third tank 30 is mounted adjacent the tanks 10 and 20 and is provided with a level sensing device 31 and a valve 32 providing selective communication between the tanks 10 and 30. A conduit 25 extends from the interior of the tank 20 to a valve member 26 which provides communication between the conduit 25 and either a vent line 27 or a conduit 33 leading to the condensing tubes 34.

A master control unit 40 is also included in the system and is connected with the pump 13, the level sensor 15, the additive reservoir 16, the valve 22, the microwave unit 24, the valve 26, the level sensor 31 and the valve 32 by means of the lines 41, 42, 43, 44, 45, 46, 47 and 48, respectively.

With the above described equipment, the operation of the system is as follows. The sewage receiving tank 10 is primed with a charge of water and chemical additives for odor and color control in an amount sufficient to provide liquid for flushing the bowl 11 each time it is used. When the level of the contents in the tank 10 reaches a point where it is detected by the level sensor 15, a signal is generated to the control unit 40 which in turn opens the valve 22 between the tank 10 and the tank 20 causing the entire contents of the tank 10 to pass into the tank 20. At the same time, the control unit 40 activates the microwave unit 24 to subject the contents of the tank 20 to microwave energy of a sufficient intensity to vaporize the liquid portion of the waste.

If desired, the control unit 40 may incorporate a timer so that the microwave unit is operated or a preset time interval each time it is actuated. Alternatively, a sensing mechanism 50 may be provided connected to the control unit by means of the line 51. The mechanism 50 monitors some physical characteristic of either the contents of the tank 20 or the tank itself, e.g., moisture content, temperature, the level of the contents inside the tank, etc., and generates a signal to the control unit 40 when some predetermined parameter is reached to thereby deactivate the microwave unit 24.

The valve 22 is opened by the control unit 40 for an interval sufficient to allow the entire contents of the tank 10 to be dropped into the tank 20. After this interval has expired the valve 22 is closed and the valve 32 interconnecting the condensing tank 30 and the sewage receiving tank 10 is opened to allow a fresh charge of priming water to be received in the tank 10. At the same time, a solenoid actuated valve 52 on the reservoir 16 is activated causing a charge of chemical additives to be injected into the tank 10.

As the microwave unit 24 vaporizes the liquid portion of the wastes now contained in the tank 20, the vapors pass through the line 25 and the valve 26 to the line 33 and the condensing tubes 34. The vapor thus condenses in the tank 30 and will continue to fill the tank until the liquid in the tank reaches the level where it is sensed by the level sensor 31. At that time, a signal is generated to the control unit 40 which activates the valve 26 to interconnect the line 25 with the vent line 27. Thus further vaporization of the liquid in the tank 20 does not result in an increase in the liquid level in the condensing tank but instead the vaporized liquid is vented overboard.

Turning now to FIG. 2 of the drawings, a second preferred embodiment of the invention is shown. As seen in FIG. 2, the sewage system may comprise a sewage receiving tank 60 having a bowl 61 mounted thereon and communicating with tank 60 through the discharge outlet 62. A wall 63 of the tank 60 is imperforate for a first portion 64 of its height to form a dam provided with an upper foraminous portion as at 65.

A second tank 70, having mounted therein level sensors 71 and 72 and a pump 73 in communication with bowl 61 by means of conduit 74, has a common wall 63 with tank 60 with communication between tanks 60 and 70 being provided by the foraminous portion 65. As in the previous embodiment, the bowl 61 and the pump 73 may be of the type shown in Pat. No. 3,067,433.

Mounted beneath the tank 60 is a third tank 80 having a valve 81 positioned therein to provide selective communication between the tanks 60 and 80. A first conduit 82 extends from the tank 80 into the tank 70 and communication between these two tanks is controlled by a valve 83. A second conduit 84 is vented overboard and is controlled by a valve 85. The tank 80 may be formed as a bottle 86 of polypropylene or the like which screws into a cap member 87 and a microwave unit 88 may be mounted on one end of the tank 80 with an enclosure 88'' acting as a shield against microwave energy. A sensing mechanism 89 may also be positioned on the cap 87 for sensing physical characteristics of either the contents of the tank 80 or the tank itself, similarly to sensing mechanism 50.

A control unit 90 is positioned adjacent to the tank 70 and is connected to the pump 73, level sensors 71 and 72, valves 81, 83 and 85, microwave unit 88 and the sensing mechanism 89 by means of the lines 91, 92, 93, 94, 95, 96, 97 and 98, respectively.

With the above described equipment, operation of the system is as follows. The tank 70 is initially provided with a priming charge of liquid and odor and color control additives. Each time the bowl is flushed liquid is transferred from the tank 70 through the pump 73 and the bowl 61 into the tank 60. When the level in the tank 60 exceeds the height of the dam formed by the imperforate portion 64 of the wall 63, the liquid passes through the perforations in the foraminous portion 65 of the wall and into the tank 70. The purpose of the foraminous portion 65 is to screen the solid sewage matter so that only liquid and finely divided solids pass from the tank 60 into the tank 70, and in this regard, instead of a perforated wall section a grid of injection molded polyvinyl chloride or a Teflon coated metal screen may also be used.

When the liquid level in the tank 70 reaches the level of the sensor 72, the sensor 72 generates a signal to the control unit 90 which causes the valve 81 to open and dump the contents of the tank 60 into the tank 80. At the same time, the microwave unit 88 is activated, subjecting the contents of the tank 80, which serves as a resonant chamber, to microwave energy of an intensity sufficient to vaporize the liquid phase of the sewage. As in the previous embodiment, the microwave unit may be either switched on for a preset time interval or it may be controlled by means of the sensor 89 detecting some physical characteristics of either the contents of the tank 80 or the tank itself, e.g., moisture content, temperature, or the level of the tank contents, and generating a signal to the control unit 90 when some predetermined parameter is detected to deactivate the microwave unit 88.

If the level of the contents of the tank 70 is above that which is sensed by the sensor 71, the valve 83 will be closed and the valve 85 opened so that the vapors from the sewage in the tank 80 are vented overboard. On the other hand, if the level of the contents of the tank 70 drops below that sensed by the sensor 71, the valve 85 will be closed and the valve 83 opened; whereby the vapors from the tank 80 are conveyed through the conduit 82 into the tank 70 below the liquid level therein where they condense and provide liquid for flushing the bowl 61.

In the two embodiments described above the vapors resulting from the microwave heating of the sewage may be condensed and recycled through the system. While this is advantageous in many environments, it will be appreciated that it does require additional power and in situations where power is at a premium, it may be desirable to eliminate this feature.

This may be accomplished, as seen in FIG. 3 of the drawings, with a system which is somewhat similar to that shown in FIG. 1, but which utilizes a liquid storage tank in place of the condensing tank. In this form of the invention, a sewage receiving tank 10' having a bowl 11' mounted thereon and in fluid communication therewith through a discharge outlet 12' is provided with a recirculating pump 13' communicating with the bowl 11' through a conduit 14'.

As in the embodiment of FIG. 1, a level sensing device 15' and a reservoir 16' are also mounted on the tank 10', while immediately beneath the tank 10' is a second tank 20' having a lining 21' and a valve 22'. Similarly, in a space between the outer wall of the tank 20' and an enclosure 23' a microwave unit 24' is mounted to subject the contents of the tank 20' to microwave energy.

In place of a condensing tank, however, a liquid storage tank 100 is provided in fluid communication with the tank 10' by means of a valve 101. While in the embodiment of FIG. 3, the tank 100 is shown as forming an integral part of the overall sewage system it will be apparent that the tank 100 could be separate from the tanks 10' and 20' and interconnected with the tank 10' by any suitable conduit.

Operation of the sewage system of FIG. 3 is similar in many respects to that of FIG. 1. Thus, the tank 10' is first primed with a charge of water and chemical additives for odor and color control in an amount sufficient to provide liquid for flushing the bowl 11' each time it is used. Also, when the level of the contents in tank 10' raises to a point where it is detected by the level sensor 15' a signal is generated to the control unit 40', which in turn opens the valve 22' between the tank 10' and the tank 20' by a signal through line 44' to empty the tank 10'. As described above in connection with the embodiment of FIG. 1, the control unit 40' then activates the microwave unit 24' through a line 45' to cause the liquid portion of the material contained in tank 20' to be vaporized.

Again, the operation of the microwave unit may be controlled by a timer in the control unit 40' or a sensing mechanism 50' connected through line 51' may be utilized similar to the sensing mechanism 50. After the valve 22' has been opened a sufficient duration to allow the contents of the tank 10' to be dropped into the tank 20', control unit 40' closes the valve 22' and through means of lines 102 and 103 causes the valve 101 to be opened and the pump 104 to be actuated a sufficient interval of time to pump enough liquid from the tank 100 into the tank 10' to serve as priming for the sewage system. Of course, the solenoid actuated valve 52' is also actuated at this time to cause a charge of chemical additives to be injected into the tank 10'.

Vaporized liquid from the tank 20' passes out through the line 105 and is vented out of the system. In this way recycling of the condensed water is avoided as well as the additional power consumption which results from such recycling and this form of the invention, therefore, may be advantageously used in situations where available power is at a premium, as in an aircraft.

Figure 4:
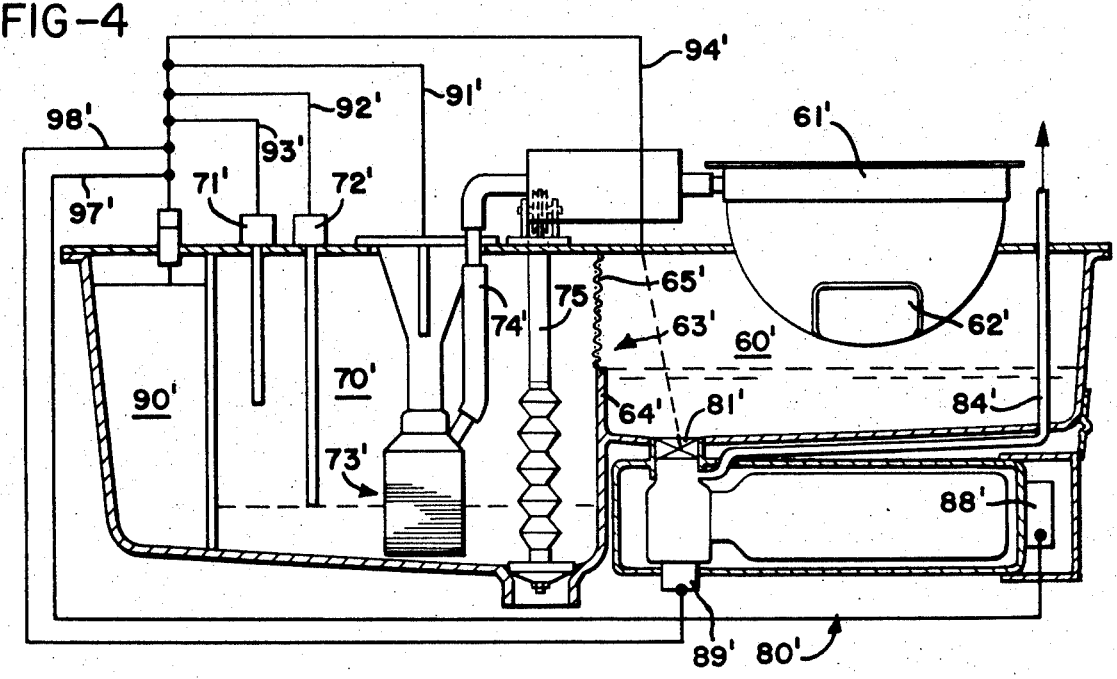
FIG. 4 is a view similar to FIG. 2 showing an additional modification.

Turning now to FIG. 4 of the drawings, a further embodiment of the invention is illustrated which, similarly to the embodiment of FIG. 3, is particularly advantageous in environments in which power is at a premium.

Thus, as seen in FIG. 4, the sewage system may include a sewage receiving tank 60' having a bowl 61' mounted thereon and communicating with the tank 60' through a discharge outlet 62'. As in the case of the embodiment of FIG. 2, a wall 63' separates the tank 60' from a second tank 70' and the wall 63' is imperforate for a portion 64' of its height to provide a dam adjacent the lower edge of an upper, foraminous portion 65' of the wall 63'. The second tank 70' has mounted therein level sensors 71' and 72', a pump 73' in communication with the bowl 61' by means of a conduit 74' and a discharge valve 75. The valve 75 may conveniently be of the type disclosed in Pat. No. 3,067,433.

Mounted beneath the tank 60' is a third tank 80' having a valve 81' positioned therein to provide selective communication between the tanks 60' and 80'. A conduit 84' extends from the tank 80' outwardly of the system for venting vapors from the tank 80' overboard. It will be noted that the tank 80' is similar to that shown in the embodiment of FIG. 2 in that it may be formed as a bottle of polypropylene or the like which screws into a cap member and a microwave unit 88' may be positioned adjacent one end of the tank 80' and provided with a shielding enclosure to prevent radiation of microwave energy out of the system. It will also be noted that a sensing mechanism 89' may be positioned on the bottle cap for sensing physical characteristics of either the contents of the tank or the tank itself, similarly to the sensing mechanism 89 of FIG. 2.

A control unit 90' is provided and is connected to the pump 73', the level sensors 72' and 71', valve 81' microwave unit 88' and the sensing mechanism 89' by means of lines 91', 92', 93', 94', 97', and 98', respectively.

Operation of the system according to FIG. 4 is as follows. The tank 70' is initially primed with a charge of odor and color control additives and a charge of liquid is pumped into the tank until the level of the liquid and additives is sensed by the sensor 72' which, through the control unit 90', generates an appropriate audio or visual signal to signify that sufficient liquid has been pumped into the tank for priming purposes. Flushing of the bowl 61' causes a portion of the priming liquid to be pumped through the conduit 74' into the bowl and outwardly through the discharge outlet 62' into the tank 60'. Ordinarily the volume of liquid transferred from the tank 70' when the system is flushed will be greater than the liquid capacity of the tank 60', so that each time the unit is flushed, including those instances when the tank 60' is empty, there will be some return of liquid over the upper edge of wall 63' through the foraminous portion 65' and back into the tank 70'.

Thus, repeated use of the system will cause the level in the tank 70' to rise as liquid passes through the forminous portion 65' of the wall 63' while at the same time any solids deposited in the tank 60' will be retained therein. When the liquid level in the tank 70' reaches a level of the sensor 71' a signal is generated to control unit 90' which in turn actuates the valve 81' and causes the high solids content of the tank 60' to pass into tank 80'. The microwave unit 88' is also activated as this time, subjecting the contents of the tank 80' to microwave energy of an intensity sufficient to vaporize the liquid portion of the sewage deposited in the tank 80'. As noted above, the microwave unit may be either switched on for a preset time interval or it may be controlled by means of the sensor 89' which detects some physical characteristic of either the contents of the tank or the tank itself and generates a signal to the control unit when some predetermined parameter is reached to deactivate the microwave unit.

Even though the material retained in the tank 60' and deposited in the tank 80' will be of relatively high solids content, it will be noted that on an absolute basis its moisture content will be relatively high. Therefore, by vaporizing the liquid portion of the sewage in the tank 80' overboard the volume of material in the tank 80' is reduced to thereby accommodate additional evacuations of the tank 60' each time the liquid level in the tank 70' reaches a height sensed by the sensor 71'. The bottle in tank 80' may, of course, be readily removed for servicing, at which time the valve 75 may be opened and the tank 70' flushed with water or the like.

In connection with each of the embodiments described above, it should be noted that the control units 40, 40', 90 and 90' will preferably incorporate a timer mechanism which will periodically cause the contents of each of the waste receiving tanks to dump into their respective evaporating tanks, regardless of the level of material in the waste receiving tank. This feature is desirable in that, if the system receives only light usage over an extended period of time, the level of the contents in the waste receiving tank does not rise sufficiently to activate the level sensing mechanism and dump the contents of the waste receiving tank and the waste materials in the tank tend to generate offensive odors after an extended period of time. Therefore, the use of a timer will cause the contents of the waste receiving tanks to be evacuated after some preset time interval, regardless of the level of material in the tanks. In the case of sewage systems in aircraft, this time interval may be conveniently selected with respect to the normal down time of the aircraft.

It should also be noted that means will preferably be provided to detect any leakage of microwave energy from the system as this energy may be dangerous to users of the system or servicing personnel.

With the above apparatus it will be apparent that by vaporizing the liquid portion of the waste or at least a substantial portion thereof, the frequency of servicing may be decreased appreciably. In practice it need not be necessary to evaporate the entire liquid portion of the sewage in the tanks until the last time the microwave unit is actuated before servicing. At this last actuation, substantially all of the moisture may be driven off from the contents of the tank for subsequent ease of handling during servicing. It will also be apparent that either the bottle or the lining of the tanks may be made of some disposable material so that it is merely necessary to withdraw the entire lining or bottle from the system and replace it with a new one. It may also be desirable in some installations for aircraft to incorporate an altimeter switch in the system which prevents vapor from being vented overboard unless the aircraft is at or above a preset altitude.

While the forms of apparatus herein described constitute preferred embodiments of the invention, it is to be understod that the invention is not limited to these precise forms of apparatus, and that changes may be made therein without departing from the scope of the invention which is defined in the appended claims.

What is claimed is:

1. A recirculating waste treatment system, which comprises:
   a toilet bowl for receiving waste;
   a water containing waste receiving tank in communication with said bowl for receivng the discharge therefrom;
   a pump for recirculating the water and waste in said tank to said bowl for flushing the toilet;
   an evaporating tank;
   means for transferring the contents of said waste receiving tank to said evaporating tank at intervals less frequent than said waste is discharged into said tank; and means for subjecting the contents of said evaporating tank to microwave energy of sufficient intensity to vaporize the liquid phase only of said waste contents contained in said evaporating tank.

2. The system of claim 1 further comprising:
(a) a condensing tank, and
(b) means for selectively conveying vapor from said evaporating tank to said condensing tank.

3. The system of claim 2 further comprising:
(a) a removable lining in said evaporating tank.

4. The system of claim 2 wherein:
(a) said pump is mounted in said waste receiving tank, and
(b) means are provided for conveying liquid from said condensing tank to said waste receiving tank.

5. The system of claim 4 further comprising:
(a) means for generating a signal when the level of the contents of said waste receiving tank increases to a predetermined level, and
(b) means for activating said transferring means and said microwave means upon generation of said signal.

6. The system of claim 5 further comprising:
(a) means for generating a signal when the level of the contents of said condensing tank increases to a predetermined level,
(b) means for selectively venting from said system vapor from said evaporating tank, and
(c) means for actuating said venting means and deactivating said vapor conveying means upon generation of a signal by said condensing tank signal generating means.

7. The system of claim 6 further comprising:
(a) means for depositing chemical additives in said waste receiving tank substantially simultaneously with the conveying of liquid from said condensing tank to said waste receiving tank.

8. The system of claim 2 wherein:
(a) said pump is mounted in said condensing tank, and
(b) means is provided for conveying liquid from said waste receiving tank to said condensing tank when the level in said waste receiving tank exceeds a predetermined level therein.

9. The system of claim 8 wherein:
(a) said last named means includes a wall in said waste receiving tank having a lower imperforate portion and an upper foraminous portion, and
(b) said condensing tank is in communication with said waste receiving tank through said upper foraminous portion.

10. The system of claim 9 further comprising:
(a) means for generating a signal when the liquid level in said condensing tank rises to a first predetermined level,
(b) means for generating a signal when the liquid level in said condensing tank drops to a second predetermined level,
(c) means for selectively venting vapor from said evaporating tank from said system,
(d) means for actuating said transferring means in response to a signal generated when said liquid level rises to said first predetermined level, and
(e) means for actuating said vapor conveying means and deactuating said vapor venting means in response to a signal generated when said liquid level drops to said second predetermined level.

11. The system of claim 10 wherein:
(a) said wall is a common wall for said waste receiving tank and said condensing tank.

12. The system of claim 11 wherein:
(a) said evaporation tank comprises a removable bottle mounted beneath said waste receiving tank.

13. The system of claim 1 further comprising:
(a) means for generating a signal at present time intervals, and
(b) means for activating said transferring means and said microwave means upon generation of said signal.

14. The system of claim 1 further comprising:
(a) a liquid storage tank in selective fluid communication with said waste receiving tank, and
(b) means for transferring liquid from said storage tank to said waste receiving tank.

15. The system of claim 1 further comprising:
(a) means defining a second tank positioned adjacent said first receiving tank and having a common wall therewith,
(b) an upper portion of said common wall being foraminous, and
(c) means for venting from said system vaporized liquid from said evaporating tank.

16. The system of claim 15 further comprising means for draining said second tank.

17. A sewage system comprising:
(a) means for generating a signal at present time intering a bowl mounted thereon and discharging said sewage into said tank,
(b) a pump mounted in said tank and in communication with said tank and said bowl for repetitvely pumping and recirculating said sewage and liquid from said tank to said bowl,
(c) a first level sensor mounted in said tank for sensing when the level of the contents of said tank rises to a predetermined level,
(d) a chemical additive reservoir in communication with said tank by means of a first solenoid actuated valve,
(e) an evaporating tank mounted beneath said waste receiving tank and connected thereto by a second valve for receiving the contents of said tank at intervals less frequent than said sewage is discharged into said tank,
(f) a microwave unit positioned adjacent said evaporating tank for evaporating the liquid phase only of said sewage,
(g) a condensing tank interconnected with said evaporating tank by means of a series of condensing tubes and with said waste receiving tank by means of a selectively operable third valve,
(h) a second level sensor mounted in said condensing tank for sensing when the liquid level in said condensing tank rises to a predetermined level, and
(i) a control unit associated with said system, in seriatim, for opening said second valve when said first level sensor senses the predetermined level for activating said microwave unit and for then opening said third valve.

18. A sewage system comprising:
(a) a waste receiving tank having a bowl mounted thereon for repetitive discharge thereinto,
(b) an evaporating tank mounted beneath said waste receiving tank and interconnected therewith through a selectively actuatable first valve,
(c) a microwave unit positioned adjacent said evaporating tank for subjecting the contents thereof to microwave energy of sufficient intensity to vaporize a liquid portion only of said contents,
(d( a condensing tank having a common wall with said waste receiving tank,
(e) said common wall extending upwardly and having a substantially imperforate lower portion and a foraminous upper portion,
(f) a pump mounted in said condensing tank and in communication with said bowl for flushing said bowl with liquid from said condensing tank,
(g) first and second level sensors mounted in said condensing tank for sensing when the liquid level in said condensing tank drops below a predetermined level and rises above a predetermined level, respectively, (h) a first conduit having a selectively operable second valve therein extending from said evaporating tank to said condensing tank, (i) a second conduit having a selectively operable third valve therein extending from said evaporating tank to a point exterior of said system, and (j) a control unit associated with said system, in seriatim, for opening said first valve when said second level sensor senses said predetermined level, for activating said microwave unit, for opening said second valve when said first level sensor senses a liquid level below said predetermined level, and for opening said third valve after said first level sensor senses a liquid level above said predetermined level.

19. A sewage system comprising:
(a) a sewage receiving and liquid containing tank having a bowl mounted thereon and discharging into said tank,
(b) a first pump mounted in said tank and in communication with said tank and said bowl for repetitively pumping and recirculating said sewage and liquid from said tank to said bowl,
(c) a level sensor mounted in said tank for sensing when the level of the contents of said tank rises to a predetermined level,
(d) a chemical additive reservoir in communication with said tank by means of a solenoid actuated first valve,
(e) an evaporating tank mounted beneath said waste receiving tank and connected thereto by a second valve for receiving the content of said tank at intervals less frequent than said sewage is discharged into said tank,
(f) a microwave unit positioned adjacent said evaporating tank,
(g) a liquid storage tank in communication with said sewage receiving tank by means of a selectively operable third valve,
(h) a second pump mounted in said liquid storage tank and in fluid communication with said selectively operable valve, and
(i) a control unit associated with said system for opening said second valve when said level sensor senses said predetermined level, for activating said microwave unit, and for opening said third valve and energizing said second pump to prime said sewage receiving tank.

20. A sewage system comprising:
(a) a first receiving tank having a bowl mounted thereon for repetitive discharge thereinto,
(b) an evaporating tank mounted beneath said first receiving tank and interconnected therewith through a selectively actuatable first valve,
(c) a microwave unit positioned adjacent said evaporating tank and subjecting the contents thereof to microwave energy of sufficient intensity to evaporate a liquid portion only of said contents,
(d) a second tank having a common wall with said waste receiving tank,
(e) said common wall extending upwardly and having a substantially imperforate wall portion and a foraminous upper portion,
(f) a pump mounted in said second tank and in communication with said bowl for filling said bowl with liquid from said second tank,
(g) a level sensor mounted in said second tank for sensing when the liquid level in said second tank rises above a predetermined level,
(h) a conduit extending from said evaporating tank to a portion exterior of said system,
(i) a control unit associated with said system for activating said microwave unit in response to a signal generated by said level sensor indicating the liquid level is above said predetermined level and,
(j) means for draining said second tank.

21. A method of treating sewage in a waste disposal system comprising:
(a) receiving sewage in a toilet bowl;
(b) discharging the sewage into a water containing sewage receiving tank,
(c) repeatedly recycling said sewage and water in the receiving tank to the toilet bowl for flushing said bowl,
(d) periodically discharging said sewage into an evaporating tank at intervals less frequent than the discharge of sewage into said receiving tank,
(e) subjecting said sewage in said evaporating tank to microwave energy of sufficient intensity to vaporize a substantial portion of only the liquid phase thereof, and
(f) venting from said system at least a portion of said vaporized sewage.

22. The method of claim 21 further comprising:
(a) condensing some of said vaporized sewage, and
(b) flushing additional sewage into said sewage receiving tank by means of said condensed vaporized sewage.

23. The method of claim 21 further comprising:
(a) venting substantially all of said vaporized sewage from said system, and
(b) subsequent to the discharge of said sewage into said evaporating tank, adding priming liquid and chemical additives to said sewage receiving tank.

References Cited

UNITED STATES PATENTS

| | | | |
|---|---|---|---|
| 1,303,358 | 5/1919 | Montgomery | 4—10 |
| 1,792,008 | 2/1931 | Fraser | 4—131 |
| 2,858,939 | 11/1958 | Corliss | 4—10 |
| 3,067,433 | 12/1962 | Dietz et al. | 4—78 |
| 3,272,338 | 9/1966 | Gallagher | 210—195 |
| 3,311,543 | 3/1967 | Loebel | 202—206 |
| 3,331,338 | 7/1967 | Blankenship | 4—131 |
| 3,474,468 | 10/1969 | Blankenship | 4—131 |
| 3,495,648 | 2/1970 | Amadon | 159—DIG. 26 |
| 3,523,076 | 8/1970 | Goerz et al. | 210—10 |
| 3,548,421 | 12/1970 | Valdespino | 4—131 |
| 3,560,347 | 2/1971 | Knapp et al. | 202—108 |
| 3,577,322 | 5/1971 | Nesbitt et al. | 203—11 |

WILBUR L. BASCOMB, JR., Primary Examiner

U.S. Cl. X.R.

203—10, 100, DIG. 5, DIG. 16; 202—160, 206, 234; 4—78; 210—10, 152; 219—10.65; 202—202

UNITED STATES PATENT OFFICE
CERTIFICATE OF CORRECTION

Patent No. 3,700,565                    Dated October 24, 1972

Inventor(s) Alan H. Cornish; Robert C. Helke; Alex N. LeDonne; Hugh E. Masters

It is certified that error appears in the above-identified patent and that said Letters Patent are hereby corrected as shown below:

In The Specification:

Column 1, line 40, change "generally" to --greatly--;
Column 1, line 48, change "a" (first occurrence) to --at--;
Column 2, line 52, change "or" to --for--;
Column 5, line 62, change "formi-" to --forami- --;
Column 5, line 69, change "as" to --at--.

In The Claims:

Claim 1, line 5, change "receivng" to --receiving--;

Claim 17, lines 2-4, cancel in its entirety and insert --a) a sewage receiving and liquid containing tank having a bowl mounted thereon and discharging said sewage into said tank,--;

Claim 19, line 17, change "content" to --contents--.

Signed and sealed this 13th day of March 1973.

(SEAL)
Attest:

EDWARD M. FLETCHER, JR.                 ROBERT GOTTSCHALK
Attesting Officer                       Commissioner of Patents